(12) United States Patent
Chen et al.

(10) Patent No.: US 9,986,885 B2
(45) Date of Patent: Jun. 5, 2018

(54) DISH TREATING APPLIANCE WITH SELF-DRAINING FEEDTUBE

(71) Applicant: WHIRLPOOL CORPORATION, Benton Harbor, MI (US)

(72) Inventors: David Chen, St. Joseph, MI (US); Kristopher L. Delgado, Stevensville, MI (US); Kevin Miller, Lawton, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 187 days.

(21) Appl. No.: 14/972,766

(22) Filed: Dec. 17, 2015

(65) Prior Publication Data
US 2017/0172375 A1    Jun. 22, 2017

(51) Int. Cl.
| A47L 15/16 | (2006.01) |
| A47L 15/22 | (2006.01) |
| A47L 15/42 | (2006.01) |
| A47L 15/44 | (2006.01) |
| A47L 15/48 | (2006.01) |
| A47L 15/50 | (2006.01) |
| F16K 1/20  | (2006.01) |

(52) U.S. Cl.
CPC ........... *A47L 15/4223* (2013.01); *A47L 15/16* (2013.01); *A47L 15/22* (2013.01); *A47L 15/4219* (2013.01); *A47L 15/4221* (2013.01); *A47L 15/4261* (2013.01); *A47L 15/4293* (2013.01); *A47L 15/44* (2013.01); *A47L 15/486* (2013.01); *A47L 15/488* (2013.01); *A47L 15/502* (2013.01); *A47L 15/507* (2013.01); *F16K 1/20* (2013.01)

(58) Field of Classification Search
CPC .............................. A47L 15/00–15/508; A47L 15/4214–15/4225; F16L 55/07; F16K 1/20–1/2092
See application file for complete search history.

(56) References Cited

U.S. PATENT DOCUMENTS

| 2,443,414 A     | 6/1948  | Burt-Wells |
| 2009/0090400 A1 | 4/2009  | Burrows et al. |
| 2010/0139698 A1* | 6/2010 | Gnadinger .............. A47L 15/23 |
|                 |         | 134/25.2 |
| 2013/0186434 A1 | 7/2013  | Ghosh et al. |
| 2014/0373885 A1 | 12/2014 | Beshears, Jr. et al. |

FOREIGN PATENT DOCUMENTS

| EP | 0780086 A2    | 6/1997  |
| JP | 2006320441 A  | 11/2006 |

OTHER PUBLICATIONS

European Extended Search Report for Counterpart EP16196580.1, dated Nov. 23, 2016, 4 pgs.

* cited by examiner

*Primary Examiner* — Spencer E Bell
(74) *Attorney, Agent, or Firm* — McGarry Bair PC

(57) ABSTRACT

A dish treating appliance has a tub at least partially defining a treating chamber for holding dishes for treatment according to an automatic cycle of operation. An access opening provides access to the treating chamber. There are multiple sprayers that emit liquid into the treating chamber, multiple feed tubes fluidly coupled to the multiple sprayers, a diverter valve selectively fluidly connecting to the multiple feed tubes, and a pump having an inlet fluidly coupled to the treating chamber and an outlet fluidly coupled to the diverter valve.

10 Claims, 6 Drawing Sheets

DISH TREATING APPLIANCE WITH SELF-DRAINING FEEDTUBE

BACKGROUND

Contemporary automatic dish treating appliances for use in a typical household include a tub and at least one rack or basket for supporting soiled dishes within the tub. A spraying system may be provided for recirculating liquid throughout the tub to remove soils from the dishes. The spraying system can have one or more sprayers which are supplied with liquid by feed tubes. Wash liquid is recirculated through the treating chamber by a wash pump which fluidly couples the treating chamber to the feed tubes to recirculate liquid in the treating chamber.

BRIEF SUMMARY

In one aspect, an embodiment of the invention relates to a dish treating appliance for treating dishes according to an automatic cycle of operation, the dish treating appliance comprising a tub at least partially defining a treating chamber for holding dishes for treatment according to the automatic cycle of operation and having an access opening providing access to the treating chamber, multiple sprayers emitting liquid into the treating chamber, and multiple feed tubes fluidly coupled to the multiple sprayers. A diverter valve selectively fluidly connects to the multiple feed tubes and a pump has an inlet fluidly coupled to the treating chamber and an outlet fluidly coupled to the diverter valve. A drain valve is provided in at least one of the feed tubes and operable between an open condition and a closed condition, wherein when liquid is supplied to the at least one feed tube with the drain valve, the drain valve is operated in the closed condition, and when liquid is not supplied to the at least one feed tube, the drain valve is operated in the open condition to drain liquid from the at least one feed tube.

In another aspect, an embodiment of the invention relates to a feed tube assembly for a dish treating appliance for treating dishes according to an automatic cycle of operation, the feed tube assembly comprising multiple feed tubes having an inlet configured to fluidly couple to a liquid source and an outlet configured to fluidly couple to a sprayer. A drain valve is provided in at least one of the feed tubes and operable between an open condition and a closed condition, wherein when liquid is supplied to the at least one feed tube with the drain valve, the drain valve is operated in the closed condition, and when liquid is not supplied to the at least one feed tube, the drain valve is operated in the open condition to drain liquid from the at least one feed tube.

DESCRIPTION OF EMBODIMENTS OF THE INVENTION

Figure 1:
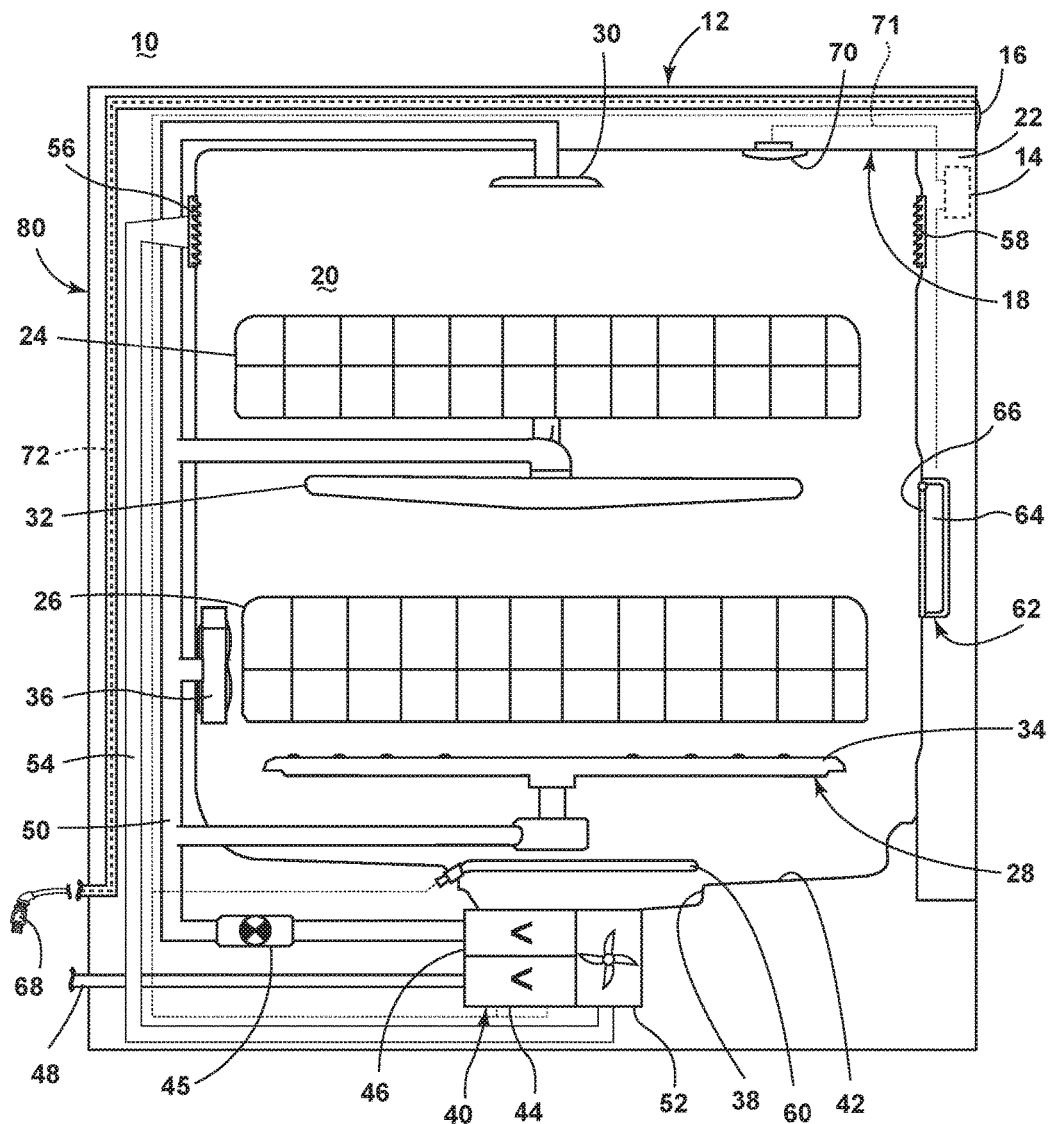
FIG. 1 is a schematic, side view of a dish treating appliance according to a first embodiment of the invention.

FIG. 1 is a schematic, side view of a dish treating appliance 10 according to a first embodiment of the invention. In FIG. 1, the dish treating appliance 10 includes a chassis 12 defining an interior. Depending on whether the dish treating appliance 10 is a stand-alone or built-in dish treating appliance, the chassis 12 may be a frame with or without panels attached, respectively. The dish treating appliance 10 shares many features of a conventional automatic dish treating appliance, which will not be described in detail herein except as necessary for a complete understanding of the invention. While the present invention is described in terms of a conventional dishwashing unit, it could also be implemented in other types of dishwashing units, such as in-sink dish treating appliances, multi-tub dish treating appliances, or drawer-type dish treating appliances.

A controller 14 may be located within the chassis 12 and may be operably coupled with various components of the dish treating appliance 10 to implement one or more cycles of operation. A control panel or user interface 16 may be provided on the dish treating appliance 10 and coupled with the controller 14. The user interface 16 may include operational controls such as dials, lights, switches, and displays enabling a user to input commands, such as a cycle of operation, to the controller 14 and receive information.

A tub 18 is located within the interior of the chassis 12 and at least partially defines a treating chamber 20 for holding dishes for treatment according to an automatic cycle of operation with an access opening in the form of an open face that provides access to the treating chamber 20. A cover, illustrated as a door 22, may be hingedly mounted to the chassis 12 and may move between an opened position, wherein the user may access the treating chamber 20, and a closed position, as shown in FIG. 1, wherein the door 22 covers or closes the open face of the treating chamber 20.

Dish holders in the form of upper and lower racks 24, 26 are located within the treating chamber 20 and receive dishes for being treated. The racks 24, 26 are mounted for slidable movement in and out of the treating chamber 20 for ease of loading and unloading. As used in this description, the term "dish(es)" is intended to be generic to any item, single or plural, that may be treated in the dish treating appliance 10, including, without limitation; dishes, plates, pots, bowls, pans, glassware, silverware, and other utensils. While not shown, additional dish holders, such as a silverware basket on the interior of the door 22 or a third level rack above the upper rack 24 may also be provided.

A spraying system 28 of multiple sprayers 30, 32, 34, 36 may be provided for emitting liquid into the treating chamber 20 and is illustrated in the form of an upper sprayer 30, a mid-level sprayer 32, a lower rotatable spray arm 34, and a spray manifold 36. The upper sprayer 30 may be located above the upper rack 24 and is illustrated as a rotatable spray arm that sprays liquid downwardly within the treating chamber 20. Mid-level rotatable sprayer 32 and lower rotatable sprayer 34 are located, respectively, beneath upper rack 24 and lower rack 26 and are illustrated as rotating spray arms. The mid-level spray arm 32 may provide a liquid spray upwardly through the bottom of the upper rack 24. The lower rotatable spray arm 34 may provide a liquid spray upwardly through the bottom of the lower rack 26. The mid-level rotatable sprayer 32 may optionally also provide a liquid spray downwardly onto the lower rack 26, but for purposes of simplification, this will not be illustrated herein.

The spray manifold 36 may be fixedly mounted to or integral with the tub 18, adjacent to the lower rack 26, and may provide a liquid spray laterally through a side of the lower rack 26. The spray manifold 36 may not be limited to this position; rather, the spray manifold 36 may be located in virtually any part of the treating chamber 20. While not illustrated herein, the spray manifold 36 may include multiple spray nozzles having apertures configured to spray wash liquid towards the lower rack 26. The spray nozzles may be fixed or rotatable with respect to the tub 18. Suitable spray manifolds are set forth in detail in U.S. Pat. No. 7,445,013, filed Jun. 17, 2003, and titled "Multiple Wash Zone Dishwasher," and U.S. Pat. No. 7,523,758, filed Dec. 30, 2004, and titled "Dishwasher Having Rotating Zone Wash Sprayer," both of which are incorporated herein by reference in their entirety. Instead of or in addition to the spray manifold 36 provided on the rear wall, nozzles can be provided on the right and left side walls of the tub 18.

A liquid recirculation system may be provided for recirculating liquid from the treating chamber 20 to the spraying system 28. The recirculation system may include a sump 38, a pump assembly 40, a diverter valve 45, and a feed tube assembly 50. The sump 38 collects the liquid sprayed in the treating chamber 20 and may be formed by a sloped or recessed portion of a bottom wall 42 of the tub 18. The pump assembly 40 may include both a drain pump 44 and a recirculation pump 46. The drain pump 44 may draw liquid from the sump 38 and pump the liquid out of the dish treating appliance 10 to a household drain line 48. The recirculation pump 46 has an inlet fluidly coupled to the treating chamber 20 such that it may draw liquid from the sump 38, and the liquid may be simultaneously or selectively pumped through an outlet that is fluidly coupled to the diverter valve 45. The diverter valve 45 is selectively fluidly connected to the feed tube assembly 50 with multiple liquid feed tubes 100, 102, 104, 106, which, in combination with the diverter valve 45, selectively provides liquid to the sprayers 30, 32, 34, 36 for selective spraying.

While the pump assembly 40 is illustrated as having separate drain and recirculation pumps 44, 46 in an alternative embodiment, the pump assembly 40 may include a single pump configured to selectively supply wash liquid to either the spraying system 28 or the drain line 48, such as by configuring the pump to rotate in opposite directions, or by providing a suitable valve system. While not shown, a liquid supply system may include a water supply conduit coupled with a household water supply for supplying water to the sump 38.

An air supply system may be provided for circulating air through the treating chamber 20 to remove humid air from the treating chamber 20 and dry the dishes in the racks 24, 26. The air supply system can include a fan or blower 52 fluidly coupled with the ambient surroundings to intake air from the exterior of the dish treating appliance 10 and an air supply conduit 54 for circulating air through the treating chamber 20 via an inlet vent 56 formed in the tub 18.

Further, the air supply system may include an outlet fluidly open to ambient air. An example of such an outlet has been illustrated as an outlet vent 58, which may exhaust the supplied air from the treating chamber 20. The outlet vent 58 may be fluidly coupled to an outlet duct (not shown), which vents into the interior of the door 22, allowing air to escape through the various openings in the door 22. Alternatively the outlet vent 58 may be formed elsewhere in the dish treating appliance 10.

A heating system having a heating element 60 may be located within or near the sump 38 for heating liquid contained in the sump 38. The heating element 60 may also heat air contained in the treating chamber 20. Alternatively, a separate heating element (not shown) can be provided for heating the air circulated through the treating chamber 20 by the blower 52. A filtering system (not shown) may be fluidly coupled with the recirculation flow path for filtering the recirculated liquid.

A dispensing system may be provided for storing and dispensing treating chemistry to the treating chamber 20. As shown herein, the dispensing system can include a dispenser 62 mounted on an inside surface of the door 22 such that the dispenser 62 is disposed in the treating chamber 20 when the door 22 is in the closed position. The dispenser 62 is configured to dispense treating chemistry to the dishes within the treating chamber 20. The dispenser 62 can have one or more compartments 64 closed by a door 66 on the inner surface of the door 22. The dispenser 62 can be a single use dispenser which holds a single dose of treating chemistry, a bulk dispenser which holds a bulk supply of treating chemistry and which is adapted to dispense a dose of treating chemistry from the bulk supply during a cycle of operation, or a combination of both a single use and bulk dispenser. The dispenser 62 can further be configured to hold multiple different treating chemistries. For example, the dispenser 62 can have multiple compartments defining different chambers in which treating chemistries can be held. While shown as being disposed on the door 22, other locations of the dispenser 62 are possible.

The dish treating appliance 10 can include various electrical components, such as lights, sensors, switches, and other powered devices. The electrical components can be coupled with a suitable electrical supply, such as a conventional household electrical socket, via a power cord 68. In one example, an electrical component in the form of a light 70 is provided for illuminating the treating chamber 20, and can be coupled with the controller 14 via electrical wiring 71. The controller 14 is in turn coupled to the power cord 68 via electrical wiring 72.

Figure 2:
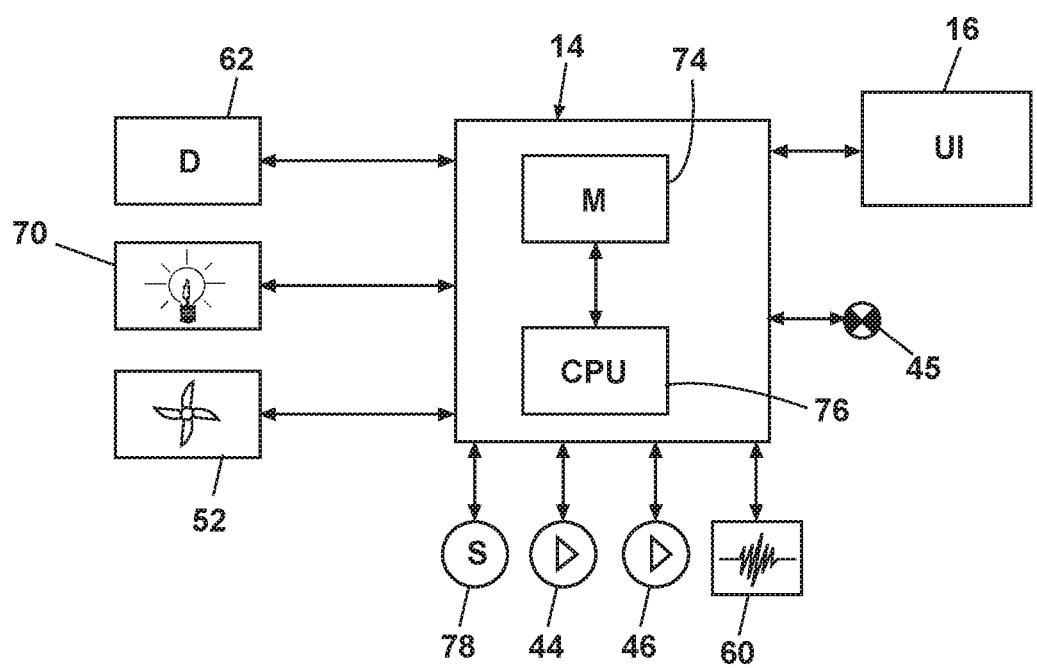
FIG. 2 is a schematic view of a controller of the dish treating appliance of FIG. 1.

FIG. 2 is a schematic view of the controller 14 of the dish treating appliance 10 of FIG. 1. As illustrated schematically in FIG. 2, the controller 14 may be coupled with the heating element 60 for heating the wash liquid during a cycle of operation, the drain pump 44 for draining liquid from the treating chamber 20, the recirculation pump 46 for recirculating the wash liquid during the cycle of operation, the blower 52 for circulating air through the treating chamber 20, the dispenser 62 for selectively dispensing treating chemistry to the treating chamber 20, and the light 70 for illuminating the treating chamber 20. The controller 14 may be provided with a memory 74 and a central processing unit (CPU) 76. The memory 74 may be used for storing control software that may be executed by the CPU 76 in completing a cycle of operation using the dish treating appliance 10 and any additional software. For example, the memory 74 may store one or more pre-programmed cycles of operation that may be selected by a user and completed by the dish treating appliance 10. The controller 14 may also receive input from one or more sensors 78. Non-limiting examples of sensors 78 that may be communicably coupled with the controller 14 include a temperature sensor and turbidity sensor to determine the soil load associated with a selected grouping of dishes, such as the dishes associated with a particular area of the treating chamber 20.

Figure 3A:
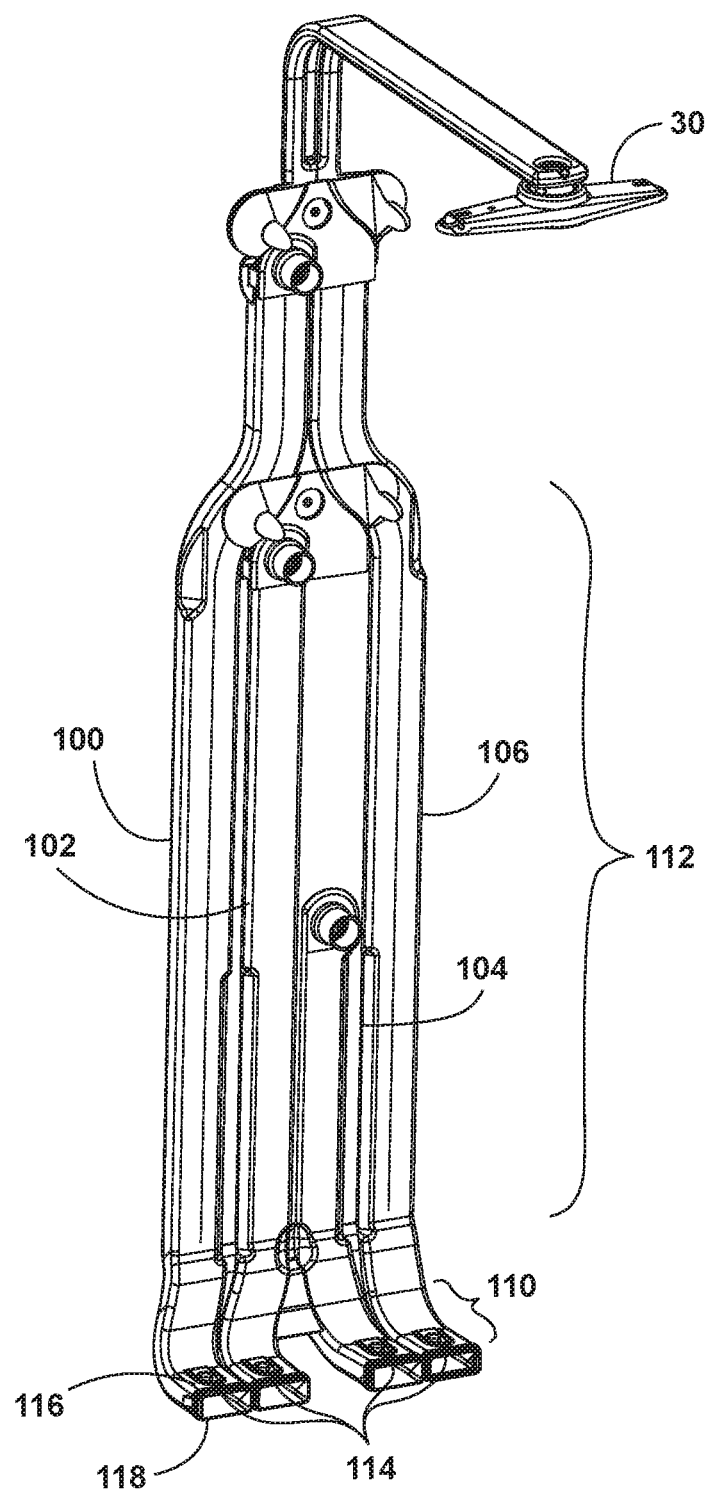
FIGS. 3A and 3B are top and bottom perspective views of a feed tube assembly of the dish treating appliance of FIG. 1.
Figure 3B:
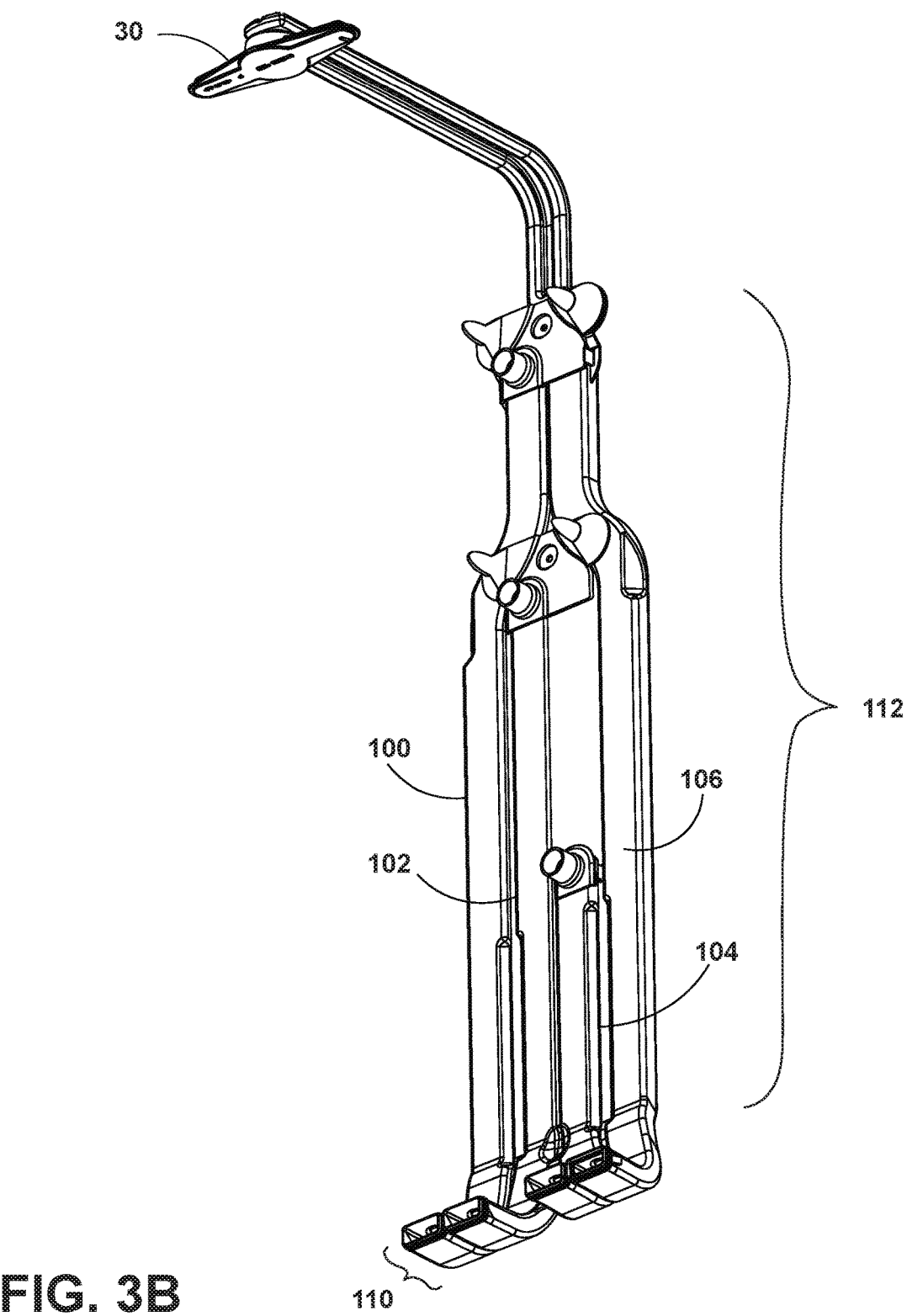

FIGS. 3A and 3B are perspective views of the feed tube assembly 50 of the dish treating appliance from FIG. 1. The feed tube assembly 50 is provided adjacent the rear wall 80 of the tub 18 and defines a plurality of feed tubes 100, 102,

104, 106 for conveying liquid to the multiple sprayers 30, 32, 34, 36. While the feed tube assembly 50 is illustrated as having four individual feed tubes 100, 102, 104, 106, it is contemplated that the feed tube assembly 50 could include any number of individual feed tubes to meet the requirements of the dish treating appliance 10. For example, there could be only a single feed tube, or there could be as many feed tubes as would fit along a wall of the tub 18. Furthermore, while the feed tube assembly 50 is illustrated as extending adjacent the rear wall 80 of the tub 18, it is also contemplated that the feed tube assembly 50 could be located adjacent any suitable wall of the tub 18.

The feed tube assembly 50 comprises multiple feed tubes 100, 102, 104, 106 each having at least a first portion 110 extending along a bottom wall 42 of the tub 18 and a second portion 112 extending along a side of the tub 18, which is illustrated herein as the rear wall 80 of the tub 18. The lowest point of the feed tubes 100, 102, 104, 106, then, is at the bottom surface 118 of the first portion 110 of the feed tubes 100, 102, 104, 106. At least one of the feed tubes 100, 102, 104, 106 is provided with a drain hole 114 that can be provided with a drain valve 150. It is contemplated that all of the feed tubes 100, 102, 104, 106 are provided with drain holes 114 having drain valves 150. While the drain holes 114 and drain valves 150 are illustrated herein as being positioned at a top surface 116 of a first portion 110 of the feed tube 100, 102, 104, 106, away from the lowest point on the bottom surface 118 of the feed tube 100, 102, 104, 106, it is also contemplated that the drain holes 114 and drain valves 150 can be located on any suitable surface of the first portion 110 or second portion 112 of the feed tubes 100, 102, 104, 106. The drain valves 150 can initially occupy an open condition, and the actuation of the drain valves 150 moves them from the initial open condition to a closed condition.

Figure 4:
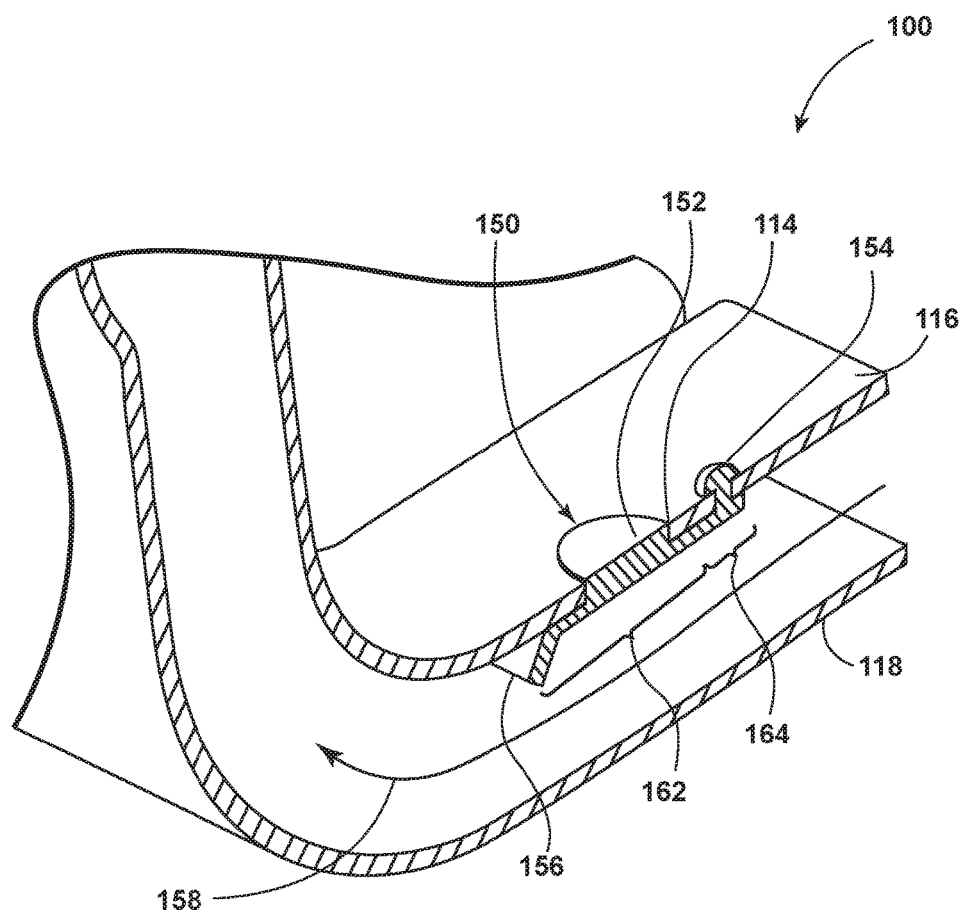
FIG. 4 is an enlarged cross-sectional view of a feed tube of the feed tube assembly of FIGS. 3A and 3B having a drain valve illustrated in a closed position.

FIG. 4 is an enlarged cross sectional view of a feed tube 100 of the feed tube assembly 50 of FIGS. 3A and 3B wherein the drain valve 150 is shown in a closed condition. In this embodiment, the drain valve 150 is illustrated as a flapper valve having a flap 162 with an anchor 164. The drain valve 150 has an attachment point 154 where the drain valve 150 is anchored to the top surface 116 of the feed tube 100. The attachment point 154 of the anchor 164 allows the drain valve 150 to function as a movable flap 162. There is a plug portion 152 of the drain valve 150 that is configured to protrude into and selectively cover the drain hole 114. The drain valve 150 is also provided with a catch surface 156 that protrudes into the channel of the feed tube 100.

Figure 5:
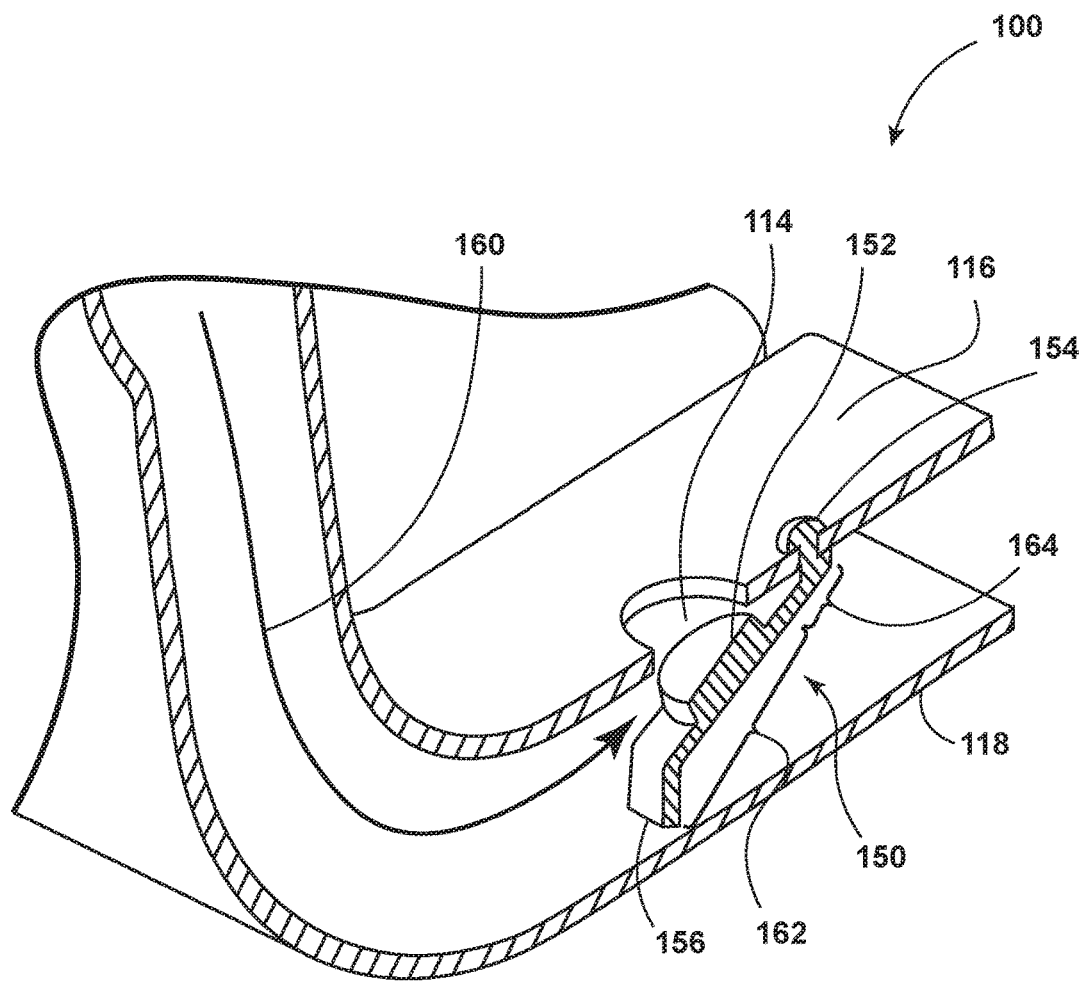
FIG. 5 is an enlarged cross-sectional view of a feed tube of the feed tube assembly of FIGS. 3A and 3B having a drain valve illustrated in an open position.

FIG. 5 is an enlarged cross sectional view of a feed tube 100 of the feed tube assembly 50 of FIGS. 3A and 3B wherein the drain valve 150 is shown in an open condition. As before, the drain valve 150 is illustrated as a flapper valve having a flap 162 with an anchor 164. When the drain valve 150 is in its open position, it is anchored to the top surface 116 of the feed tube 100 at the attachment point 154. The body of the drain valve 150 is positioned such that it protrudes into the channel of the feed tube 100 at an angle and the plug portion 152 is not in contact with or covering the drain hole 114. In this way, the drain hole 114 is in fluid communication with the channel of the feed tube 100 when the drain valve 150 is in the open condition.

Turning now to the operation of the feed tube assembly 50 and the drain holes 114 and drain valves 150 of the feed tubes 100, 102, 104, 106, the drain valves 150 in at least one of the feed tubes 100, 102, 104, 106 are operable between the open condition and the closed condition. When the pump 46 is operating to supply liquid through the at least one feed tube 100 having a drain valve 150, the flapper drain valve 150 is operated in the closed condition and the drain hole 114 is closed to prevent the flow of liquid through the drain hole 114. Rather, the liquid flowing through the feed tube 100 follows a flow path 158 and the force of the flowing liquid holds the drain valve 150 in the closed condition.

When the pump 46 ceases operating and liquid is not supplied to the at least one feed tube 100, the drain valve 150 is then operated in the open condition to drain residual liquid from the at least one feed tube 100 along a flow path 160. When liquid is not supplied to the feed tube 100, the drain valve 150 is no longer held in the closed condition and can flap downwardly to the open condition in which the flap is normally biased away from the drain hole 114. To aid in the opening of the drain valve 150, the drain valve 150 is provided with a catch surface 156 which is confronted by the reverse flow of liquid in the feed tube 100 once the pump 46 is no longer pumping liquid through the feed tube 100. When the pump 46 ceases operation, the residual liquid in the feed tube 100 runs down the second portion 112 by way of gravitational force, confronting the catch surface 156 of the drain valve 150 and facilitating movement of the drain valve 150 to the open condition. Once the drain valve 150 has been biased to its open condition, the residual liquid follows a flow path 160 to drain out of the feed tube 100 according to gravitational forces. Thus, the drain valve 150 switches between the closed and open conditions in response to the pumping or not-pumping of liquid through the at least one feed tube 100. In an exemplary embodiment, the diameter of the drain hole 114 is sufficiently large that the residual liquid can drain from the feed tube 100 by gravitational flow within a predetermined period of time, which can be, for example, two to three seconds.

The above-described embodiments provide a variety of benefits, including that significant amounts of washing liquid are not trapped in the feed tubes and removed from the cycle of operation. In today's dish treating appliances, assemblies with multiple feed tubes may become more common. It is disadvantageous for significant amounts of water to be left in one feed tube when the flow of liquid from the pump has been diverted to a different feed tube. Particularly in multiple feed tube contexts, if residual liquid were left in two or more feed tubes, the amount of liquid effectively removed from circulation in the cycle of operation could be detrimental to the operation of the dish treating appliance. The invention described herein minimizes the amount of water lost from the cycle of operation, and does so without the need for additional electronics or pumps, but rather uses a passive gravity-driven draining system.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure. Further, while the invention has been specifically described in connection with certain specific embodiments thereof, it is to be understood that this is by way of illustration and not of limitation.

The patentable scope of the invention is defined by the claims, and can include other examples that occur to those skilled in the art. It will be understood that any features of the above-described embodiments can be combined in any manner. Reasonable variation and modification are possible within the scope of the forgoing disclosure and drawings without departing from the spirit of the invention, which is defined in the appended claims.

What is claimed is:

1. A dish treating appliance for treating dishes according to an automatic cycle of operation, the dish treating appliance comprising:
a tub at least partially defining a treating chamber for holding dishes for treatment according to the automatic cycle of operation and having an access opening providing access to the treating chamber;
multiple sprayers emitting liquid into the treating chamber;
multiple feed tubes fluidly coupled to the multiple sprayers;
a diverter valve selectively fluidly connected to the multiple feed tubes;
a pump having an inlet fluidly coupled to the treating chamber and an outlet fluidly coupled to the diverter valve; and
a liquid-actuated drain valve provided in at least one of the feed tubes and having a closed condition in response to liquid pumped to the at least one feed tube and an open condition in response to liquid not being pumped to the at least one feed tube;
wherein when liquid is pumped to the at least one feed tube, the pumped liquid holds the liquid-actuated drain valve in the closed condition and when liquid is not pumped to the at least one feed tube, a reverse flow of liquid confronts a catch surface of the liquid-actuated drain valve and biases the liquid-actuated drain valve to the open condition.

2. The dish treating appliance of claim 1 wherein more than one of the feed tubes has a drain valve.

3. The dish treating appliance of claim 2 wherein all of the feed tubes have a drain valve.

4. The dish treating appliance of claim 1 wherein the at least one feed tube has a lowest point and the drain valve is located other than the lowest point.

5. The dish treating appliance of claim 1 wherein the at least one feed tube has at least a first portion extending along a bottom of the tub and a second portion extending along a side of the tub, with the drain valve located in one of the first or second portions.

6. The dish treating appliance of claim 5 wherein the at least one feed tube has at least a top surface and a bottom surface, and the drain valve is located in one of the top or bottom surfaces.

7. The dish treating appliance of claim 6, wherein the drain valve is located in the top surface on the first portion.

8. The dish treating appliance of claim 1 wherein the drain valve is a flapper valve comprising a movable flap selectively covering a hole in the feed tube.

9. The dish treating appliance of claim 8 wherein the flap is normally biased away from the hole in the feed tube.

10. The dish treating appliance of claim 8 wherein the flap has the catch surface confronting a reverse flow in the at least one feed tube.

* * * * *